(12) United States Patent
Plastina et al.

(10) Patent No.: US 7,533,091 B2
(45) Date of Patent: May 12, 2009

(54) METHODS, SYSTEMS, AND COMPUTER-READABLE MEDIA FOR GENERATING A SUGGESTED LIST OF MEDIA ITEMS BASED UPON A SEED

(75) Inventors: Daniel Plastina, Sammamish, WA (US); Jonathan M. Cain, Seattle, WA (US); Michael J. Novak, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 315 days.

(21) Appl. No.: 11/100,022

(22) Filed: Apr. 6, 2005

(65) Prior Publication Data
US 2006/0230065 A1 Oct. 12, 2006

(51) Int. Cl.
G06F 17/00 (2006.01)

(52) U.S. Cl. .............. 707/5; 707/3; 707/10; 707/104.1; 705/26; 709/219

(58) Field of Classification Search ........................ None
See application file for complete search history.

(56) References Cited

U.S. PATENT DOCUMENTS

| | | | |
|---|---|---|---|
| 5,265,248 A * | 11/1993 | Moulios et al. ............. | 718/100 |
| 5,616,876 A | 4/1997 | Cluts | |
| 5,749,081 A | 5/1998 | Whiteis | |
| 6,041,311 A | 3/2000 | Chislenko et al. | |
| 6,118,450 A | 9/2000 | Proehl et al. | |
| 6,243,725 B1 | 6/2001 | Hempleman et al. | |
| 6,311,194 B1 | 10/2001 | Sheth et al. | |
| 6,351,596 B1 * | 2/2002 | Ostrover ....................... | 386/46 |
| 6,356,971 B1 | 3/2002 | Katz et al. | |
| 6,438,579 B1 | 8/2002 | Hosken | |
| 6,452,609 B1 | 9/2002 | Katinsky et al. | |
| 6,453,336 B1 | 9/2002 | Beyda et al. | |
| 6,453,339 B1 | 9/2002 | Schultz et al. | |

(Continued)

FOREIGN PATENT DOCUMENTS

EP 1189437 A1 3/2002

(Continued)

OTHER PUBLICATIONS

MusicMatch, MusicMatch Jukebox User's Guide, Feb. 7, 2003, Chapters A1-A6 & 1-9.

*Primary Examiner*—Cam Y Truong
*Assistant Examiner*—Shyue Jiunn Hwa
(74) *Attorney, Agent, or Firm*—Senniger Powers LLP

(57) ABSTRACT

A system and method for suggesting a list of media items to a user. The method comprises presenting a user with a selection element for gathering a seed for generating a list of media items related to the seed. The method further receives a seed selection from the user and identifies one or more characteristics of the seed. The method further generates a suggested list of media items with characteristics corresponding to the one or more characteristics of the seed. The method additionally presents the user with the suggested list of media items and a choice of selecting media items or groups of media items in the suggested list. A system for executing the method comprises a user interface, a processor, and a data source for generating the suggested list by evaluating characteristics of the media items to similar find media items.

15 Claims, 6 Drawing Sheets

U.S. PATENT DOCUMENTS

| | | |
|---|---|---|
| 6,526,411 B1 | 2/2003 | Ward |
| 6,539,395 B1 * | 3/2003 | Gjerdingen et al. ......... 707/102 |
| 6,545,209 B1 | 4/2003 | Flannery et al. |
| 6,605,770 B2 * | 8/2003 | Yamane et al. ................. 84/609 |
| 6,657,117 B2 | 12/2003 | Weare et al. |
| 6,662,231 B1 * | 12/2003 | Drosset et al. .............. 709/229 |
| 6,721,741 B1 | 4/2004 | Eyal et al. |
| 6,748,395 B1 | 6/2004 | Picker et al. |
| 6,760,721 B1 * | 7/2004 | Chasen et al. .................. 707/3 |
| 6,771,568 B2 | 8/2004 | Hochendoner |
| 6,772,408 B1 | 8/2004 | Velonis et al. |
| 6,941,324 B2 | 9/2005 | Plastina et al. |
| 6,947,922 B1 | 9/2005 | Glance |
| 6,961,549 B2 | 11/2005 | Mori |
| 6,973,451 B2 | 12/2005 | Laronne et al. |
| 6,996,390 B2 | 2/2006 | Herley et al. |
| 7,043,525 B2 | 5/2006 | Tuttle et al. |
| 7,072,846 B1 * | 7/2006 | Robinson ..................... 705/10 |
| 7,149,983 B1 | 12/2006 | Robertson et al. |
| 2001/0031066 A1 | 10/2001 | Meyer et al. |
| 2002/0001395 A1 | 1/2002 | Davis et al. |
| 2002/0033844 A1 | 3/2002 | Levy et al. |
| 2002/0041692 A1 | 4/2002 | Seto et al. |
| 2002/0055951 A1 | 5/2002 | Shigetomi et al. |
| 2002/0059584 A1 | 5/2002 | Ferman et al. |
| 2002/0069218 A1 | 6/2002 | Sull et al. |
| 2002/0087565 A1 | 7/2002 | Hoekman et al. |
| 2002/0099737 A1 | 7/2002 | Porter et al. |
| 2002/0103796 A1 | 8/2002 | Hartley |
| 2002/0103920 A1 | 8/2002 | Berkun et al. |
| 2002/0113824 A1 | 8/2002 | Myers |
| 2002/0120925 A1 | 8/2002 | Logan |
| 2002/0134220 A1 | 9/2002 | Yamane et al. |
| 2002/0138619 A1 | 9/2002 | Ramaley et al. |
| 2002/0143976 A1 | 10/2002 | Barker et al. |
| 2002/0146235 A1 | 10/2002 | Watanabe et al. |
| 2002/0147728 A1 | 10/2002 | Goodman et al. |
| 2002/0157095 A1 | 10/2002 | Masumitsu et al. |
| 2002/0193895 A1 | 12/2002 | Qian et al. |
| 2002/0194260 A1 | 12/2002 | Headley et al. |
| 2002/0196976 A1 | 12/2002 | Mihcak et al. |
| 2003/0009469 A1 | 1/2003 | Platt et al. |
| 2003/0033420 A1 | 2/2003 | Eyal et al. |
| 2003/0036948 A1 | 2/2003 | Woodward et al. |
| 2003/0045953 A1 | 3/2003 | Weare |
| 2003/0045954 A1 | 3/2003 | Weare et al. |
| 2003/0106058 A1 | 6/2003 | Zimmerman et al. |
| 2003/0120928 A1 | 6/2003 | Cato et al. |
| 2003/0135513 A1 | 7/2003 | Quinn et al. |
| 2003/0182254 A1 | 9/2003 | Plastina et al. |
| 2003/0182255 A1 | 9/2003 | Plastina et al. |
| 2003/0182315 A1 | 9/2003 | Plastina et al. |
| 2003/0221541 A1 | 12/2003 | Platt |
| 2003/0225777 A1 | 12/2003 | Marsh |
| 2003/0227478 A1 | 12/2003 | Chatfield |
| 2003/0236582 A1 | 12/2003 | Zamir et al. |
| 2004/0002310 A1 * | 1/2004 | Herley et al. ............. 455/179.1 |
| 2004/0006575 A1 | 1/2004 | Visharam et al. |
| 2004/0017997 A1 | 1/2004 | Cowgill |
| 2004/0059795 A1 | 3/2004 | Ramey |
| 2004/0060426 A1 | 4/2004 | Weare et al. |
| 2004/0064476 A1 | 4/2004 | Rounds |
| 2004/0086268 A1 | 5/2004 | Radha et al. |
| 2004/0089141 A1 * | 5/2004 | Georges et al. ................ 84/609 |
| 2004/0123725 A1 | 7/2004 | Kim |
| 2004/0128308 A1 | 7/2004 | Obrador |
| 2004/0143604 A1 | 7/2004 | Glenner et al. |
| 2004/0172593 A1 | 9/2004 | Wong et al. |
| 2004/0186993 A1 | 9/2004 | Risan et al. |
| 2004/0210533 A1 | 10/2004 | Picker et al. |
| 2004/0254659 A1 | 12/2004 | Bolas et al. |
| 2004/0260786 A1 | 12/2004 | Barile |
| 2004/0267693 A1 | 12/2004 | Lowe et al. |
| 2005/0021500 A1 | 1/2005 | Plastina et al. |
| 2005/0033657 A1 * | 2/2005 | Herrington et al. ............ 705/26 |
| 2005/0098023 A1 | 5/2005 | Toivonen et al. |
| 2005/0229225 A1 | 10/2005 | Klausberger et al. |
| 2005/0234958 A1 | 10/2005 | Sipusic et al. |
| 2005/0278726 A1 | 12/2005 | Cano et al. |
| 2006/0032363 A1 | 2/2006 | Platt |
| 2006/0271989 A1 | 11/2006 | Glaser et al. |

FOREIGN PATENT DOCUMENTS

| | | | |
|---|---|---|---|
| WO | 0128222 | A2 | 4/2001 |
| WO | 03023781 | A1 | 3/2003 |

* cited by examiner

FIG. 3

Seed Songs:

| Artist | Track | | |
|---|---|---|---|
| 10,000 Maniacs | Candy Everybody Wants | | |

| Artist | Track | Chosen by Art. | Dist to Seed |
|---|---|---|---|
| 10,000 Maniacs | Candy Everybody Wa... | | 0 |
| Tori Amos | In the Springtime of Hi... | | 0.134500... |
| The Cranberries | Everything I Said | | 0.114668... |
| The Smiths | Asleep | | 0.260352... |
| Sarah McLachlan | Ice | | 0.129701... |
| Beth Orton | Someone's Daughter | | 0.194902... |
| Paula Cole | Hush, Hush, Hush. | | 0.099333... |
| Joan Osborne | Right Hand Man | | 0.153715... |
| Tori Amos | Professional Widow | | 0.149393... |
| Natalie Merchant | Life Is Sweet | | 0.102175... |
| The Cranberries | Disappointment | | 0.127905... |
| Sarah McLachlan | Plenty | | 0.138048... |
| Vonda Shepard | Searchin' My Soul | | 0.192205... |
| Suzanne Vega | Solitude Standing | | 0.200156... |
| Dave Matthews Band | Rhyme & Reason | | 0.209391... |
| Crash Test Dummies | Two Knights and Mai... | | 0.240281... |
| Shawn Colvin | Sunny Came Home | | 0.214199... |
| Dido | My Lover's Gone | | 0.182466... |
| Tori Amos | She's Your Cocaine | | 0.099388... |
| Cowboy Junkies | Cowboy Junkies Lam... | | 0.162653... |

METHODS, SYSTEMS, AND COMPUTER-READABLE MEDIA FOR GENERATING A SUGGESTED LIST OF MEDIA ITEMS BASED UPON A SEED

TECHNICAL FIELD

Embodiments of the present invention relate to the field of intelligently generating a suggested list of media items related to a seed selected by a user. In particular, embodiments of this invention relate to methods, systems, and computer readable media capable of authoring a suggested list of media items with characteristics corresponding to characteristics of a particular seed (e.g., a media item) selected by a user. The selected list is presented to the user for selecting one or more of the media items, while each of the presented media items remains unselected until selected by the user.

BACKGROUND OF THE INVENTION

Due to recent advances in technology, computer users are now able to enjoy many features that provide an improved user experience, such as playing various media and multimedia content on personal, laptop, or handheld computers, as well as cellular phones and other portable media devices. For example, most computers today are able to play compact discs (CDs) and have an internet connection capable of streaming and downloading audio and video so users can listen to their favorite media while working on their computers. Many computers are also equipped with digital versatile disc (DVD) drives enabling users to watch movies.

In some multimedia environments, a computer has access to a computer-readable medium storing media files such as Moving Picture Experts Group audio layer-3 (MP3) files and WINDOWS MEDIA technologies audio (WMA) and video files. The computer typically organizes the media files into playlists when the compressed media files are played on the computer.

Conventionally, users must expend considerable time and energy to build a playlist of media items (e.g., video files, music files, photos, etc.) of any complexity. Media items must be individually selected and added to each playlist. In addition to the effort required, users may also have difficulty constructing a playlist including each of the media items they desire. For example, remembering the name of each particular media item (or artist, genre, creator, creation date, style, etc.) to include in a playlist is difficult. This inability to recall each desirable media item can lead to a user-created playlist that includes only a few common media items familiar to the user. Such a playlist can be mundane, repetitive, and generally not pleasing, even to the user who created it.

The issue of recalling media items of interest is exacerbated with the era of online media libraries, such as for music and other audio, movies and other video, among others. For example, a single user can subscribe to a media service (e.g., a subscription service) having over a million available media items. Such a subscription simply provides too many choices for a single user to review and consider for a playlist.

Media enthusiasts are capable of creating their own playlists media item by media item. For example, such users may wish to hand pick their playlists so that the playlist exactly reflects their vision for the playlist. These users are not typically interested in having a playlist automatically created by a system or program. Even so, such media enthusiasts may still wish to have some assistance from a system or program in creating a list of potential media item choices. Such a user may find suggestions of media items beneficial, such that playlist authoring may be made easier and quicker, but not automatic. In other words, sophisticated listeners may enjoy a limited amount of help, while retaining ultimate control of the playlist authoring process. Moreover, media enthusiasts may wish to review media item suggestions based upon measurable characteristics (e.g., audio characteristics, bibliographical metadata, commercially or community generated subjective/editorial metadata, etc.).

Unfortunately, these issues are not addressed by any conventional system. Conventional techniques provide only limited amounts of assistance to the user in creating playlists, such as sorting by media type or artist. Such conventional techniques provide no suggestion of media items based upon media items or related media selected by the user. There is a need, therefore, for a system or method capable of providing intelligent suggestions to users without taking control over the playlist authoring process. In other words, the system or method assists the user in playlist creation by offering media item suggestions associated with a seed provided by the user, but without altering any user playlist without express selection of particular media item suggestions by the user. Accordingly, a solution that enhances playlist creation by providing media item suggestions based upon characteristics of user seed selections is desired.

SUMMARY OF THE INVENTION

Accordingly, a method (or a system) for suggesting a list of media items to a user is desired to address one or more of these and other disadvantages. The method comprises presenting a user with a selection element for gathering a seed for generating a list of media items related to the seed, receiving a seed selection from the user, identifying one or more characteristics of the seed, and generating a suggested list of media items with characteristics corresponding to characteristics of the seed. For example, embodiments of the invention may be well-suited for providing assistance to sophisticated users in creating a highly tailored and personalized playlists with maximum control over the playlist by the user, while still utilizing the strength of the system for suggesting additional media items for the playlist. Advantageously, aspects of the present invention suggest addition of media items to playlists based upon both user seed selections.

In one aspect of the invention, a method for suggesting a list of media items to a user is disclosed. The system comprises presenting a user with a selection element for gathering a seed for generating a list of media items related to the seed. The method also receives a seed selection from the user and identifies one or more characteristics of the seed. The method further generates a suggested list of media items with characteristics corresponding to the characteristics of the seed. The generating further comprises determining a score for the seed, determining a score for each media item in a candidate list of media items, and selecting at least one media item from the candidate list based upon the relationship between the score of the seed and the score of the at least one media item.

In another aspect of the invention, a system for facilitating a user in generating a suggested list of one or more media items is disclosed. The system comprises a data source containing a library of media items and a user interface adapted for receiving a seed selection from a user. The system further comprises a processor adapted for identifying one or more characteristics of the seed and for identifying one or more characteristics of each of the media items of the library. The processor is further adapted for determining a score for the seed based upon the one or more characteristics and for determining a score for each of the media items of the library based upon the one or more characteristics. The processor is further adapted for generating a suggested list of media items from the library with characteristics corresponding to one or more characteristics of the seed.

In still another aspect of the invention, a computer-readable medium having computer-executable instructions for suggesting a list of one or more media items to a user is disclosed. The computer-executable instructions for performing the steps comprise the presenting, receiving, identifying, and generating generally as set forth above with respect to the method of the present invention.

Alternatively, the invention may comprise various other methods, systems, computer-readable media, and apparatuses.

Other features will be in part apparent and in part pointed out hereinafter.

BRIEF DESCRIPTION OF THE DRAWINGS

FIG. 3 depicts an exemplary user interface of the present invention;

Corresponding reference characters indicate corresponding parts throughout the drawings.

DETAILED DESCRIPTION OF THE INVENTION

System for Generating a Suggested List of One or More Media Items

Figure 1:
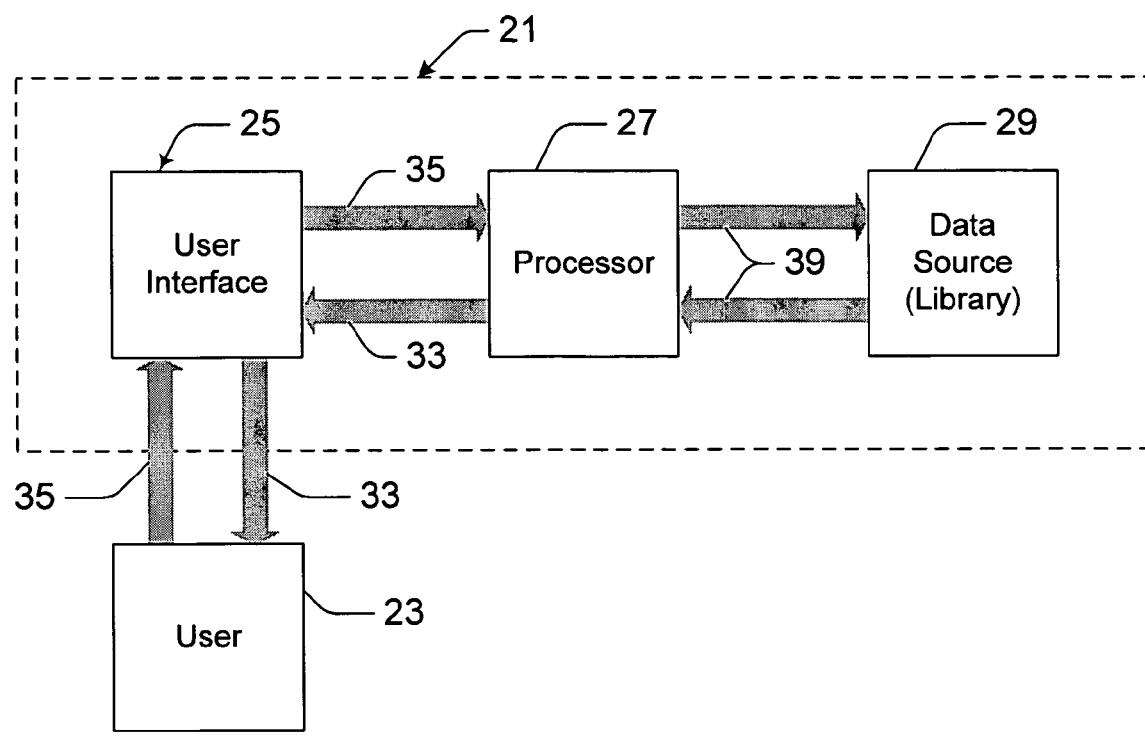
FIG. 1 is a diagram of a system of the present invention for generating a suggested list of media items.

Referring now to FIG. 1, a system, generally indicated at 21, is disclosed for facilitating a user 23 in generating a suggested list of one or more media items. In one example, the user 23 may be collecting desirable media items for use in a user-defined playlist of media items. As used herein, the term media item comprises media files of multiple formats, including, music, speeches, audio books, news reports, movies, movie trailers, audio blogs, radio stations, television shows, images, and comedy routines, among others. As used herein, the term playlist means an ordered list of media items for the user 23 to play (in the case of music or video) or access (in the case of images or text files). In one example, the user 23 may utilize a media player program on a computer 130 (see FIG. 6) to access the playlist of media items. An example of such a media player is the Windows® Media Player by Microsoft Corporation of Redmond, Wash.

The system 21 depicted in FIG. 1 comprises several components, including a user interface, generally indicated 25, a processor 27, and a data source 29 containing a library of media items. The user interface provides information 33 to the user 23 and receives instructions 35 from the user. For instance, the user interface 25 is adapted for receiving a seed selection from the user 23. As explained below, the system 21 utilizes the seed to generate the suggested list of media items for the user 23. The seed functions as the starting point for the system 21 in determining what media items to suggest. In a typical example, the user 23 would select a seed that they would like to find more media items similar to, such that the system 21 identifies other media items the user may find similar to the seed. The seed may be anything that provides the system 21 with a place to begin assembling the suggested list. In a music scenario, for example, the seed may comprise one or more of a media item (e.g., Sunday Bloody Sunday by U2), an artist (e.g., Beck), and an album name (e.g., Sweat by Nelly), among others. In a movie scenario, for example, the seed may comprise one or more of a media item (e.g., Terminator), an actor (e.g., Tom Hanks), and a studio (e.g., Paramount), among others. The user interface 25 is adapted for presenting a selection element 125 (see FIG. 4) to the user 23 (e.g., see FIG. 2), as described in detail below. The selection element 125 may comprise at least one of a pull-down menu, a pop-up menu, a check box, a button, and any other selection element. The selection element provides the user 23 with an opportunity to select a seed for submission to the system 21.

The system 21 additionally comprises the data source, or library, 29. The data source either stores a number of media items for use by the user 23 (i.e., a library) or provides a listing of what media items are available along with how to access such media items (e.g., data links) for use by the user. In one example, the media items contained in the library 29 are defined by the user 23. Such a library may be stored on a user's computer 130 (see FIG. 6), a portable media playing device (e.g., an MP3 player), a storage device (e.g., a flash memory device), or virtually any other data source. In another example, a service provider maintains a large library 29 of media items at a separate storage facility (e.g., a server) for streaming to the user 23 upon request. In yet another example, the library 29 may be defined by both a user's personal library of media items and the media items provided by a service provider. In any case, however, the library 29 acts as a repository for media items of potential of interest to the user 23. Such libraries of media items may be very large, containing many tens, hundreds, or thousands of media items, making it difficult to review or recall each of the media items when constructing a playlist.

The processor 27 of the system is adapted for identifying one or more characteristics of the seed and generating the suggested list of media items from the library with characteristics corresponding to one or more characteristics of the seed. The processor receives 35 instructions and selections from the user through the user interface 25. The processor 27 provides information 33 to the user 23 through the user interface 25. For example, the user interface 25 is adapted for presenting the user with the suggested list of media items from the processor and providing a selection element for user selection of one or more media items from the suggested list from the processor. Each of the presented media items remains separate from any user playlist or group of selected media items until deliberate selection of one or more media items by the user. This feature provides the user with ultimate control over which of the media items from the suggested list is selected. This level of control is desirable for a user who wishes to compile her own playlist of media items with assistance from the system 21, but without relinquishing any control over the selection of media items. The processor 27 communicates 39 with the data source 29 to access the candidate media items. The detailed operation of the system 21 will be described in greater detail below with respect to the methods of the present invention.

As would be readily understood by one skilled in the art, the aforementioned system 21 does not require the user 23 to be presently accessing the World Wide Web or other information source to use the system. Once the system 21 has collected metadata for all of the accessible media items, the system may be executed locally, whereby the user need not disclose any private history regarding songs stored, accessed, played, etc.

Methods for Suggesting a List of Media Items

Figure 2:
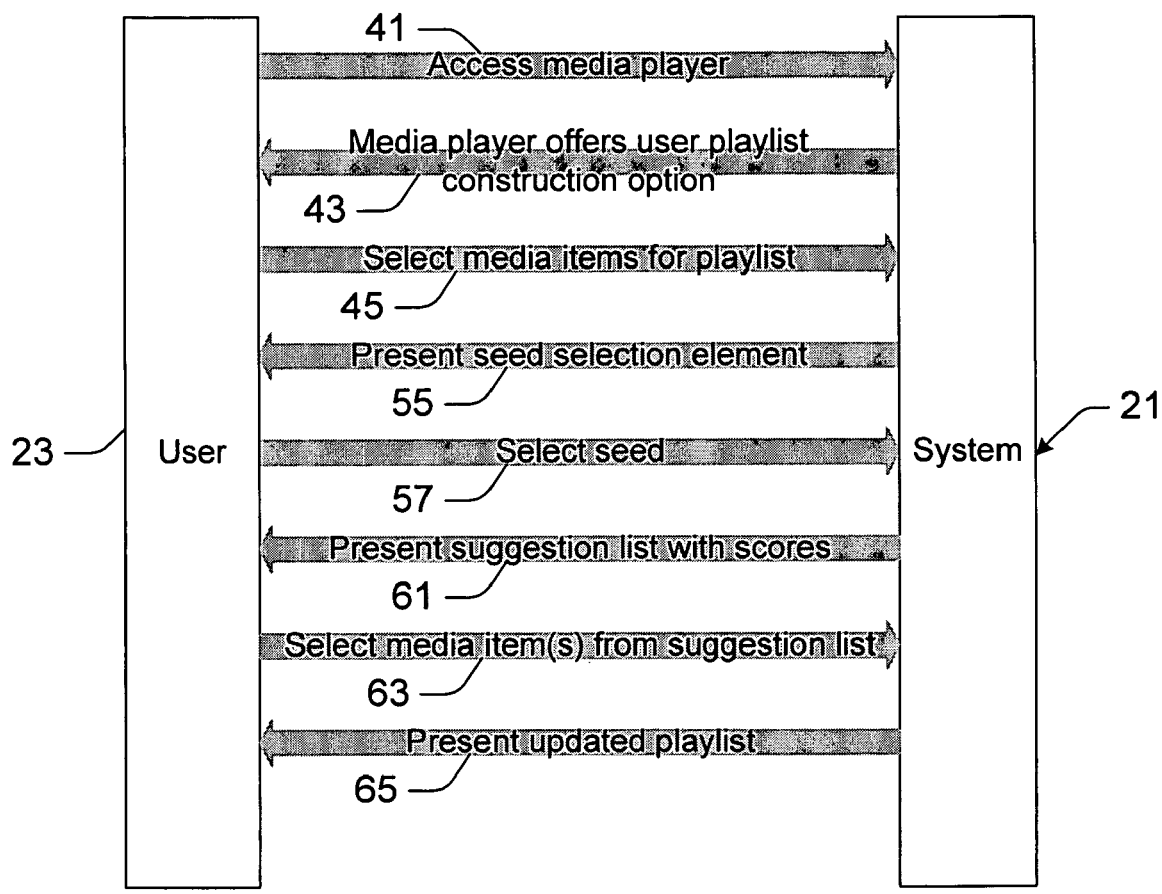
FIG. 2 is a diagram of communication transfer between a user and the system of FIG. 1.

The present invention further comprises methods for suggesting a list of media items to the user 23. FIG. 2 is a diagram of communication between the user 23 and the system 21 of FIG. 1 according to one exemplary method. The process begins conventionally with the user 23 accessing the media player at 41. The system 21 then offers the user 23 the option of constructing a playlist at 43. As with conventional media players, the user may then select media items for inclusion in the playlist at 45.

Turning to the features of the present invention, the user interface 25 presents the user with a selection element at 55 for gathering a seed for generating a list of media items related to the seed. The selection element presented by the system 21 may be associated with at least one of a media item, an artist, and an album name currently displayed on the user interface 25. The selection element may also be selected from a menu listing (e.g., a pull-down or pop-up menu) or provided through a search query.

Once the user 23 selects a seed (e.g., a media item) with the user interface 25, the processor 27 of the system 21 receives the seed selection at 57 from the user through the user interface. As noted above in the music example, the seed received may be at least one of a media item, an artist, an album name, and other media identifiers. In another example, the received seed, for example a media item, is currently displayed in a playlist on the user interface 25. In another example, the received seed is displayed in at least one of a pull-down menu, a dialog box, and a search result on the user interface 25. Other seeds presented in other manners on the user interface 25 are also contemplated as within the scope of the claimed invention.

With the seed selection, the processor 27 identifies one or more characteristics of the seed and generates a suggested list of media items with characteristics corresponding to characteristics of the seed. The processor 27 generates such a suggested list by determining a score for the seed, determining a score for each media item in a candidate list of media items, and selecting at least one media item from the candidate list based upon the relationship between the score of the seed and the score of the at least one media item. As discussed above, the candidate list of media items may be all or a portion of a library 29 defined by the user, defined by a service provider, or the combined media items of the user and the service provider.

In particular, determining a score for the seed changes depending upon the type of seed selected by the user 23. For example, when the seed is a media item (e.g., Sunday Bloody Sunday by U2, Complicated by Avril Lavigne, etc.), the method evaluates at least two characteristics (e.g., audio characteristics, bibliographical metadata, commercially or community generated subjective/editorial metadata, etc.) of the seed media item. Other media items by the artist are not considered. In this situation, therefore, different media items by the same artist can yield very different suggested lists of media items, depending upon the type of media item selected (e.g., a ballad versus a rock and roll song). When the seed is an album, on the other hand, the method evaluates at least two characteristics (e.g., audio characteristics, bibliographical metadata, commercially or community generated subjective/ editorial metadata, etc.) of the media items on an album. In one example, the evaluating may comprise averaging the scores of each media item on the album included in the candidate list of media items. Where only a portion of the album's media items are in the candidate list, or library 29, of media items, only those media items are included in the scoring. In another example, the method may evaluate all of the media items on an album, or another portion of the media items from the album, such as only those media items highly rated by the user 23. Other selection criteria regarding which of the media items of the album should be utilized for scoring purposes are also contemplated as within the scope of the present invention.

When the seed is an artist (e.g., U2, Avril Lavigne, etc.), the method evaluates at least two characteristics (e.g., audio characteristics, bibliographical metadata, commercially or community generated subjective/editorial metadata, etc.) of media items performed by the selected artist. In one example, the evaluating may comprise averaging the scores of each media item performed by the artist in the candidate list of media items. In another example, the method may evaluate each media item performed by the artist, or another portion of media items, such as only those media items performed by that artist highly rated by the user. Other selection criteria regarding which of the media items by an artist should be utilized for scoring purposes are also contemplated as within the scope of the present invention.

Utilizing the media items associated with a particular seed as described above, determining the score for the seed additionally comprises calculating the seed score based upon the evaluation of the characteristics (e.g., audio characteristics, bibliographical metadata, commercially or community generated subjective/editorial metadata, etc.) of the associated media items. For an audio characteristic example, the characteristics may comprise at least one of rhythm time, rhythm type, style, sub-genre, vocal voices, flavor, mood, emotion, density, weight, musical consonance, melodic movement, tempo, and rhythm activity. Such audio evaluation techniques are well known in the art. An example of such a music evaluation technique is discussed in U.S. Pat. No. 6,545,209, assigned to Microsoft Corporation of Redmond, Wash. For a commercially generated subjective/editorial metadata example, the sound of one media item or artist may be characterized by the following words: rousing, fin, playful, rambunctious, exuberant, brash, energetic, ambitious, somber, reflective, refined/mannered, stylish, of angst-ridden; while another artist may be characterized by the following words: swaggering, hungry, bravado, reflective, ambitious, sexy, intimate, freewheeling, cathartic, dramatic, fun, lively, energetic, playful, provocative, rollicking, theatrical, stylish, earnest, literate, and visceral. As would be readily appreciated by one skilled in the art, other words may also be utilized to describe such artists or media items, and such characteristic words may be utilized to compare similarities between such artists and media items.

Similarly, determining the score for each media item in the candidate list comprises evaluating at least two characteristics of each media item in the candidate list and calculating the score for each media item based upon the evaluation of the characteristics. This determining process utilizes the same characteristics as the process for determining the scores of the media items associated with the seed.

Once the system 21 determines the scores for each media item in the candidate list and for the seed, the method generates the suggested list of media items by further selecting media items from the candidate list having scores closest to the score of the seed. Because the scores are based upon related, measurable characteristics (e.g., audio characteristics, bibliographical metadata, commercially or community generated subjective/editorial metadata, etc.), choosing scores close to the seed will provide media items having similar musical qualities. Once the suggested list of media items is generated by the processor 27, the user interface 25 presents the user with the suggested list of media items at 61 and a choice of selecting media items or groups of media items in the suggested list. Each of the presented media items remains unselected by the system 21 until selected by the user. This feature provides the user with ultimate control over which of the media items from the suggested list is selected. This level of control is desirable for a user who wishes to compile her own playlist of media items with assistance from the system 21, but without relinquishing any control over the selection of media items. In addition, the method also presents the user with the score for the seed at 61 and the scores for each media item in the suggested list of media items. If the user 23 encounters a suggested media item that is unknown to him, the user may compare the score of the unknown media item with the scores of other familiar media items to help determine if the unknown media item may be desirable.

After the user 23 reviews the suggested list, the user may select, via the user interface 25, at least one media item for the playlist from the suggested list at 63. Once the user 23 selects one or more media items from the suggested list, the system 21 may present the user with a playlist at 65, via the user interface 25, comprising at least the one or more media items selected from the suggested list. The playlist may also include media items previously selected by the user 23.

After the user 23 has selected the media items for his playlist, the user may additionally choose another seed for evaluation by the system 21. For example, the user 23 may select one of the suggested media items (or an artist or album associated with a suggested media item) as the next seed.

Although much of the previous discussion is directed to examples involving songs, it should be readily apparent to one skilled in the art that other media items may be similarly treated without departing from the scope of the claimed invention.

As would be readily understood by one skilled in the art, the aforementioned methods do not require the user 23 to be presently accessing the World Wide Web or other information source to utilize the methods. Once the method has collected metadata for all of the accessible media items, the method may be executed locally, whereby the user need not disclose any private history regarding songs stored, accessed, played, etc.

User Interfaces

FIG. 3 depicts an exemplary user interface 25 of the present invention. In a first window pane 71, the seed media item 73 is depicted as artist 10,000 Maniacs song, Candy Everybody Wants. A window pane label 75 identifies Candy Everybody Wants as the seed media item. In a second window pane 79, the suggested list of media items, generally indicated 81, is depicted. Each of the media items in the suggested list 81 may include a selection element, such as a checkbox (not shown), for use by the user to select one or more media items. The list 81 further includes several columns 83, including Artist name, Track (i.e., media item) name, and Distance to Seed. The artist and track columns 83 are self-evident identifiers of the performing artist and title of each media item in the suggested list 81. The distance column 83' denotes the distance (i.e., the musical difference) between each respective media item of the suggested list 81 and the seed media item 73. This distance corresponds to the score discussed above. The smaller the distance, the more similar the two compared media items, while the larger the distance, the less similar the two compared media items, although the media items shown in the suggested list of FIG. 3 are similar to the seed item 73, hence their inclusion in the suggested list 81. For example, the first media item in the suggested list is the seed media item 73, Candy Everybody Wants with a distance of zero from itself. The second media item 87 in the suggested list is In the Springtime of His Voodoo by Tori Amos, which is a distance of 0.134500 from the seed, Candy Everybody Wants. The fourth media item 89 in the suggested list is Asleep by The Smiths, which is a distance of 0.260352 from the seed, Candy Everybody Wants. In this example, therefore, the media item having a smaller distance to the seed, In the Springtime of His Voodoo by Tori Amos, may be marginally more desirable, although both may be considered similar to the seed. Excluded from the suggested list 81, however, are media items determined to have even larger distances from the seed 73. Those media items are not suggested because they do not appear to be similar enough to the seed item to be included.

Figure 3A:
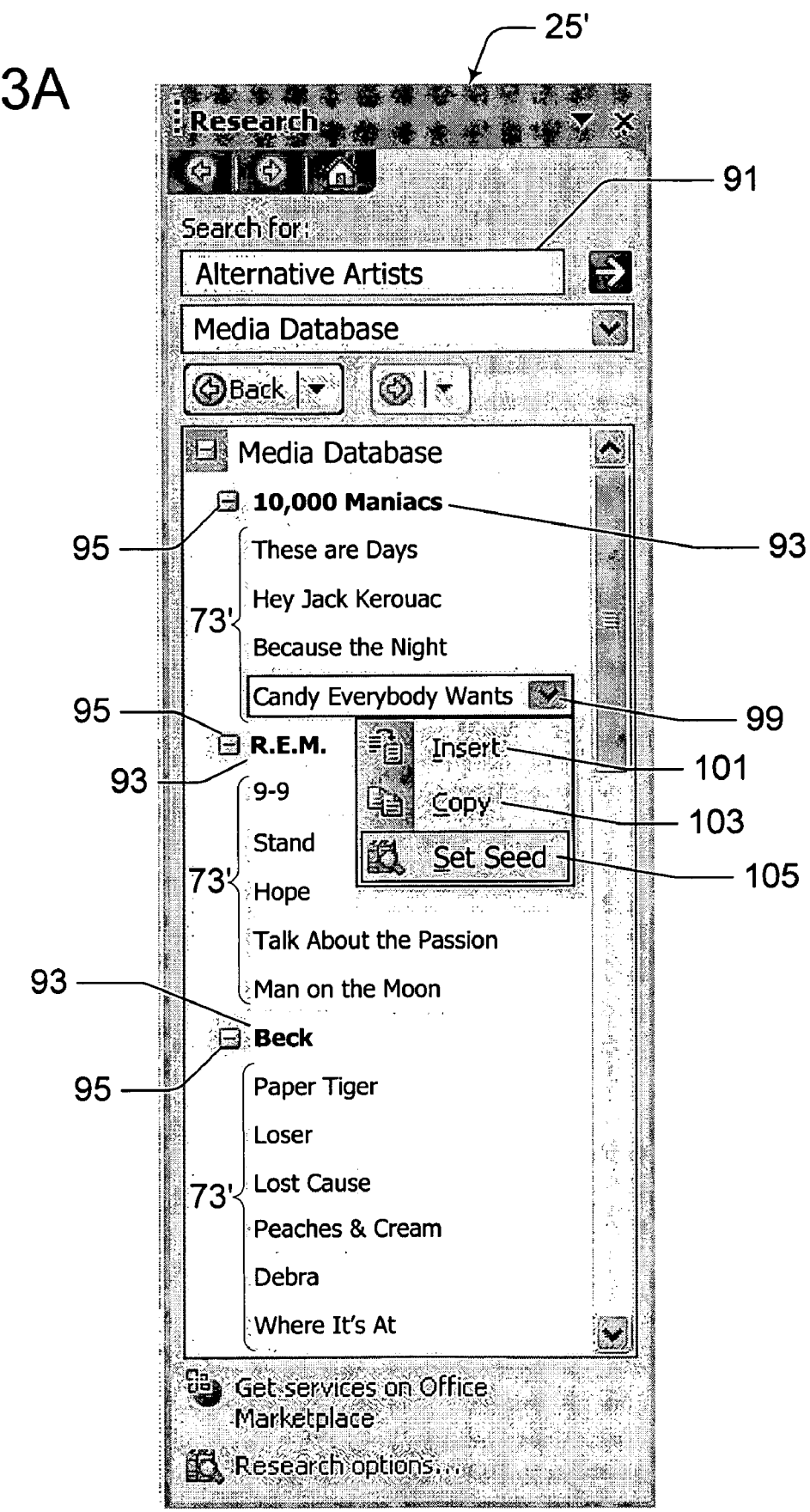
FIG. 3A depicts another exemplary user interface of the present invention.

FIG. 3A depicts another exemplary user interface 25' of the present invention. The user interface 25' of FIG. 3A is similar to the user interface 25 of FIG. 3. With this interface, the user searches in a dialog box 91 for a particular item of interest, such as a music genre or category (e.g., Alternative Artists). This search generates several potential artists 93 (e.g., artists "10,000 Maniacs", "R.E.M.", and "Beck"), whereby the user can select an expansion/contraction element 95 associated with one or more of the artists to reveal a list of potential seed media items 73' associated with the respective seed. To select a particular seed media item 73', the user selects a pull-down menu 99 (or other selection element) associated with the seed media item to reveal one or more choices associated with the seed media item. Such choices include selecting the media item 73' for a playlist at 101, copying the media item for pasting at 103, or selecting the media item as a seed at 105, among others. One skilled in the art would readily understand that other textual cues (e.g., "Sounds like this song") may be substituted for "Set Seed" in the pull-down menu 99 to provide a more pleasing user experience, without departing from the scope of the invention.

Figure 4:
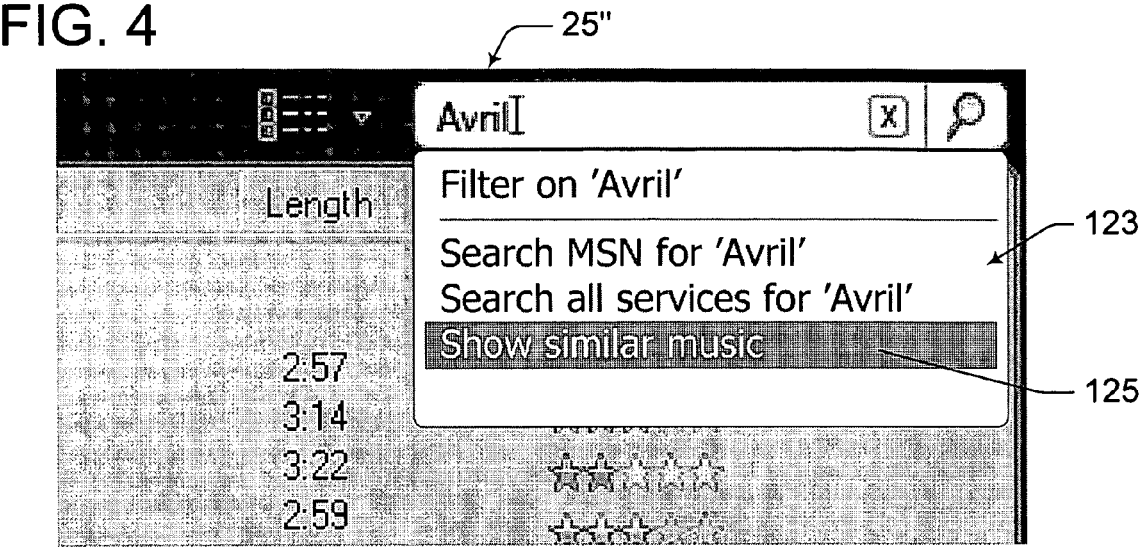
FIG. 4 depicts still another exemplary user interface of the present invention.

FIG. 4 depicts still another exemplary user interface 25" of the present invention. A pull-down menu, generally indicated 123, allows the user to select a seed to tell the system 21 to provide a suggested list 81 of media items. In this example, a selection element 125 is incorporated into the pull-down menu 123 of media player (e.g., Windows® Media Player by Microsoft Corporation of Redmond, Wash.) whereby the user may select "Show similar music." Because the pull-down menu 123 is associated with the artist Avril Lavigne, selecting the selection element "Show similar music" 125 instructs the system 21 to provide a suggestion list 81 of media items similar to the artist Avril Lavigne, as was depicted for another media item in FIG. 3. In another example, the pull-down menu may also list one or more of the albums of Avril Lavigne, such that the album may be selected as the seed. In still another example, a submenu associated with each album may list each media item on a particular album, such that an individual media item, rather than the artist or album, may be selected as the seed.

As would be readily understood by one skilled in the art, the aforementioned user interfaces 25, 25', 25" do not require the user 23 to be presently accessing the World Wide Web or other information source. Once the system 21 has collected metadata for all of the accessible media items, the user interfaces 25, 25', 25" may be executed locally, whereby the user need not disclose any private history regarding songs stored, accessed, played, etc.

Computer-Readable Medium for Suggesting a Media Items

Figure 5:
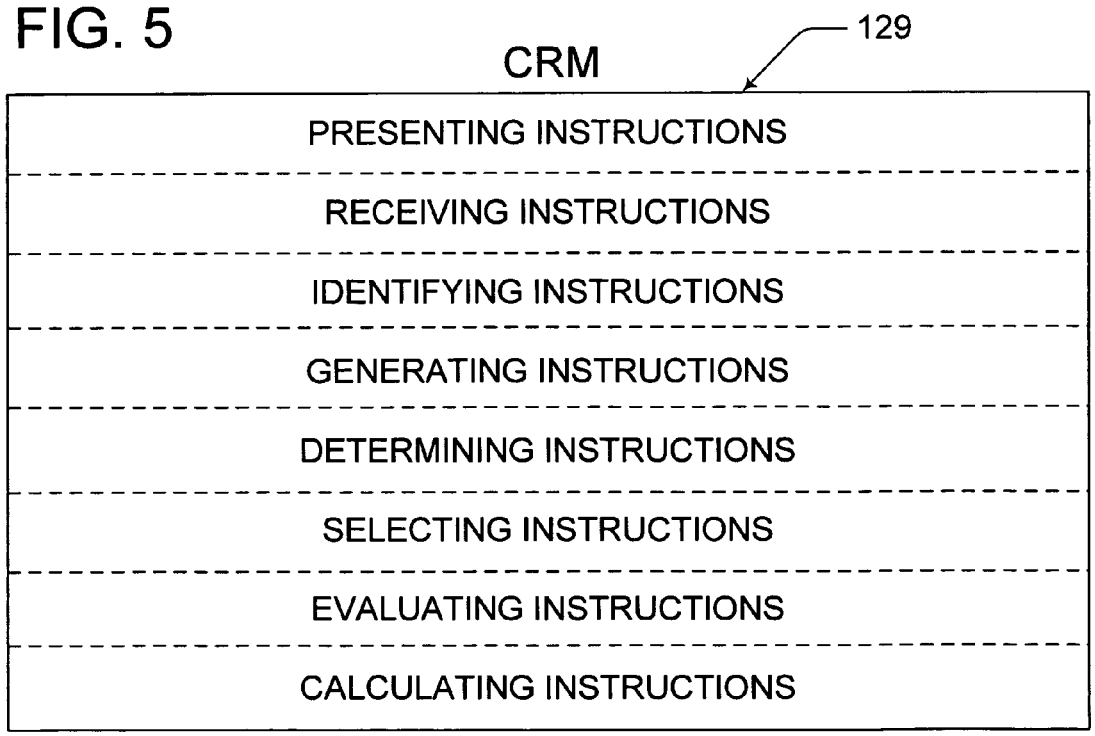
FIG. 5 is a diagram of a computer-readable medium (CRM) of the present invention.

FIG. 5 is a diagram of a computer-readable medium (CRM) of the present invention, generally indicated 129. The computer-readable medium 129 has computer-executable instructions for suggesting a list of one or more media items to a user. The computer-executable instructions for performing steps comprise presenting instructions for presenting a user with a selection element for gathering a seed for generating a list of media items related to the seed. The instructions further comprise receiving instructions for receiving a seed selection from the user and identifying instructions for identifying one or more characteristics of the seed. The instructions further comprise generating instructions for generating a suggested list of media items with characteristics corresponding to the one or more characteristics of the seed. The instructions further comprise determining instructions for determining a score for the seed, determining instructions for determining a score for each media item in a candidate list of media items, and selecting instructions for selecting at least one media item from the candidate list based upon the relationship between the score of the seed and the score of the at least one media item.

The instructions may further comprise presenting instructions for presenting the user with the suggested list of media items and a choice selecting media items or groups of media items in the suggested list. The instructions may further comprise receiving instructions for receiving a user selection of at least one media item from the suggested list and presenting instructions for presenting the user with a playlist comprising the at least one media item selected from the suggested list. It should be noted here that the instructions ensure that each of the presented media items remains unselected until selected by the user. This feature provides the user with ultimate control over which of the media items from the suggested list is selected. This level of control is desirable for a user who wishes to compile her own playlist of media items with assistance, but without relinquishing any control over the selection of media items.

The instructions further comprise determining instructions for determining a score for the seed and determining instructions for determining a score for each media item in a candidate list of media items. The instructions may further comprise selecting instructions for selecting at least one media item from the candidate list based upon the relationship between the score of the seed and the score of the at least one media item.

The determining instructions for determining a score for the seed further comprise at least one of evaluating instructions for evaluating at least two characteristics of a media item when the seed when is the media item, evaluating instructions for evaluating at least two characteristics of media items on an album when the seed is the album, and evaluating instructions for evaluating at least two characteristics of media items performed by an artist when the seed is the artist. The determining instructions for determining a score for the seed further comprise calculating instructions for calculating the seed score based upon the evaluation of the characteristics. The determining instructions for determining a score for each media item in the candidate list comprise evaluating instructions for evaluating at least two characteristics of each media item in the candidate list and calculating instructions for calculating the score for each media item based upon the evaluation of the characteristics.

General Purpose Computing Device

Figure 6:
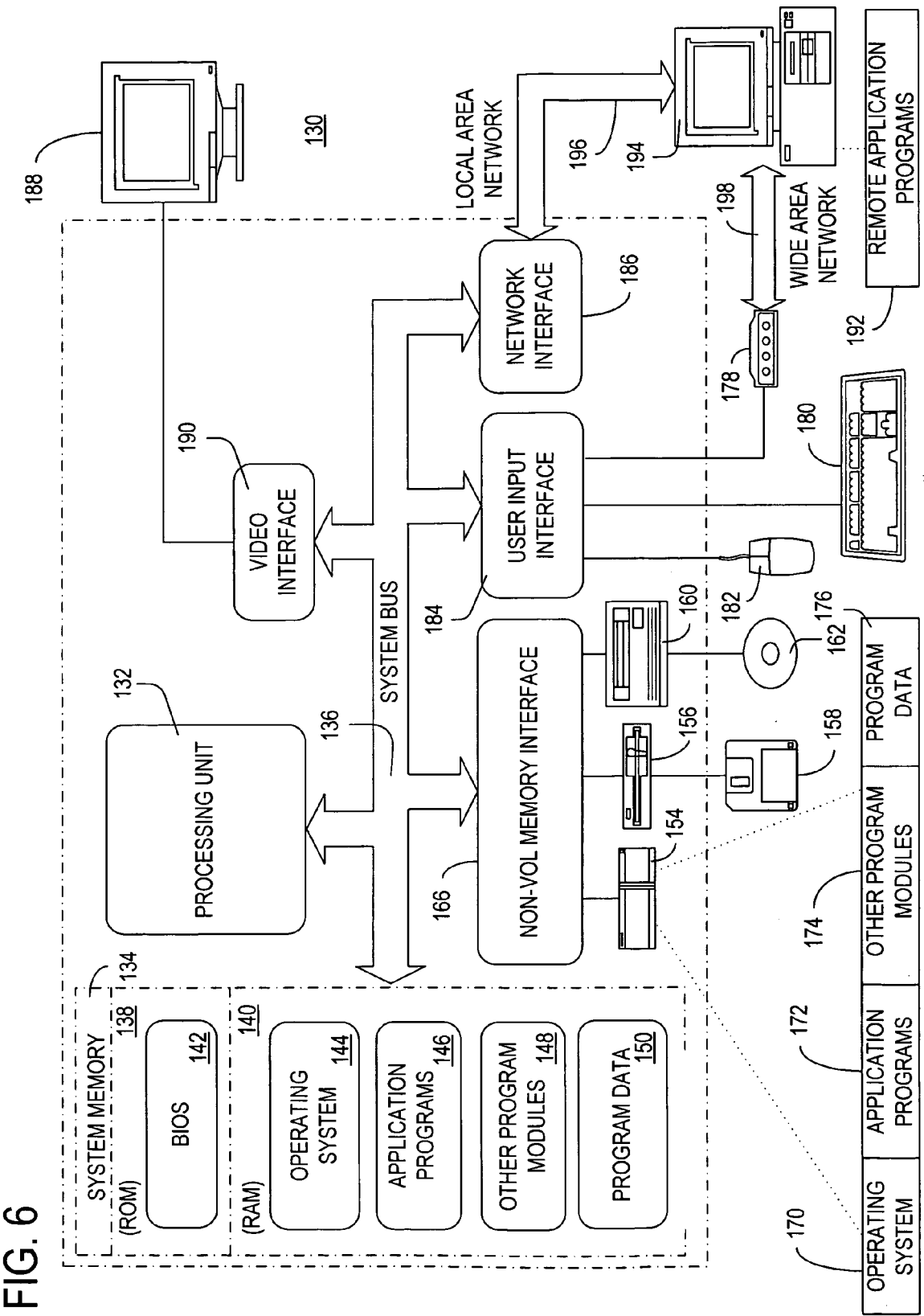
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. In one example, the system 21 discussed above may be embodied by computer 130. Computer 130 additionally has one or more processors or processing units 132 and a system memory 134. In one example, the processor 27 discussed above may be embodied by processors or processing units 132. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media which include both volatile and nonvolatile media removable and non-removable media may be any available medium that can be accessed by computer 130. By way of example and not limitation, computer readable media comprise communication media. Computer storage medium include volatile and nonvolatile storage medium, removable and non-removable storage medium implemented in any method or technology for storage of information such as computer readable instructions, data structures, program modules or other data. In one example, computer storage medium include RAM, ROM, EEPROM, flash memory or other memory, CD-ROM, digital versatile disks (DVD) or other optical disk storage, magnetic cassettes, magnetic tape, magnetic disk storage or other magnetic storage devices, or any other storage medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media such as a wired network or direct-wired connection, and wireless media such as acoustic, RF, infrared, and other wireless media are examples of communication media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. In one example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown). In one example, the user interfaces 25, 25', 25" discussed above may be embodied by such input devices and monitors.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, in one example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a method such as described above for suggesting a list of media items to a user. The computer 130 (or its components) present a user with a selection element for gathering a seed for generating a list of media items related to the seed. The computer 130 (or its components) receives a seed selection from the user, identifies one or more characteristics of the seed, and generates a suggested list of media items with characteristics corresponding to characteristics of the seed. The computer 130 (or its components) presents the user with the suggested list of media items and a choice of selecting media items or groups of media items in the suggested list.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having"

are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for suggesting a list of media items utilizing one or more computers by a user, said method comprising:
presenting a user with a selection element for gathering a seed for generating a list of media items related to the seed, said selection element including a plurality of media items, each of presented media items in the selection element remaining unselected and un-played by a media player system;
receiving a seed selection from the user, said seed being a starting point for determining what media items to suggest to the user, said received seed selection remaining un-played by the media player system upon being selected, said seed selection including at least one of a media item, an artist, an album name, and another media identifier, said selection being displayed as highlighted and distinguished over other media items in at least one of a playlist, a pull-down menu, a dialog box, and a search result on the selection element;
in response to the received seed selection, identifying one or more characteristics of said seed;
in response to the identified characteristics of the seed, generating a suggested list of media items with characteristics corresponding to the one or more characteristics of said seed selection without playing the seed selection, wherein said generating comprises determining a score for said seed, determining the score for each media item in a candidate list of media items, and selecting at least one media item from said candidate list based upon the relationship between the score of the seed and the score of the at least one media item, wherein each of the media items in the generated suggested list remains separate from any user playlist or group of selected media items until deliberate selection of one of the media items in the suggested list,
wherein said determining the score for said seed comprises at least one of the following: evaluating at least two characteristics of media items on an album when said seed is said album; and evaluating at least two characteristics of media items performed by the artist when said seed is said artist, wherein said evaluating at least two characteristics of media items on the album when said seed is said album comprises averaging the scores of each media item on the album in candidate list of media items to create said seed score, and wherein said evaluating at least two characteristics of media items performed by the artist when said seed is said artist comprises averaging the scores of each media item performed by said artist in said candidate list of media items to create said seed score; and
on the one computer, presenting the user with the suggested list of media items and presenting the user with the score for said seed and the scores for each media item in said candidate list of media items.

2. The method of claim 1 further comprising presenting the user with the suggested list of media items and a choice of selecting a media item or a group of media items in the suggested list, each of said presented media items remaining unselected by the media player system until selected by the user.

3. The method of claim 2 further comprising receiving a user selection of at least one media item from the suggested list.

4. The method of claim 3 further comprising presenting the user with a playlist comprising said at least one media item selected from the suggested list.

5. The method of claim 2 wherein said presenting the user with the suggested list further comprises presenting a selection element associated with at least one of a media item, an artist, and an album name currently displayed on a user interface.

6. The method of claim 5 wherein said presenting the user with the selection element further comprises presenting the selection element associated with at least one of a media item, an artist, and an album name currently displayed in a playlist on a user interface.

7. The method of claim 1 wherein said determining a score for said seed comprises evaluating at least two characteristics of a media item when said seed when is said media item; and
wherein said determining further comprises
calculating said seed score based upon the evaluation of said characteristics; and
wherein said determining a score for each media item in the candidate list comprises evaluating at least two characteristics of each media item in the candidate list and calculating said score for each media item based upon the evaluation of said characteristics.

8. The method of claim 7 wherein said generating a suggested list of media items further comprises selecting media items from the candidate list having scores closest to the score of said seed.

9. The method of claim 7 wherein said characteristics may comprise at least one of the audio characteristics of rhythm time, rhythm type, style, sub-genre, vocal voices, flavor, mood, emotion, density, weight, musical consonance, melodic movement, tempo, and rhythm activity.

10. A system for facilitating a user in generating a suggested list of one or more media items, said system comprising:
one or more computers;
a data source containing a library of media items, said library of media items remaining unselected and un-played by the system;
a memory for storing the data source;
a user interface for receiving a seed selection from a user, said seed being a starting point for determining what media items to suggest to the user, said seed selection remaining un-played by the system upon being selected, said seed selection including at least one of a media item, an artist, an album name, and another media identifier, wherein said user interface presents a selection element to the user, said selection element comprising at least one of a pull-down menu, a pop-up menu, a check box, and a button, wherein the received selection appears to be highlighted and distinguished over other media items in the selection element; and
a processor responsive to the received seed selection for identifying one or more characteristics of the seed and for identifying one or more characteristics of each of said media items of said library, said processor further for determining a score for said seed based upon said one or more identified characteristics and for determining score for each of said media items of said library based upon said one or more identified characteristics, said processor responsive to the identified characteristics of the seed for generating a suggested list of media items from the library with characteristics corresponding to the one or more characteristics of said seed based upon said score of said seed and said score of each of said media items of said library, without playing the seed selection, wherein each of the media items in the generated suggested list remains separate from any user playlist or group of selected media items until deliberate selection of one of the media items in the suggested list wherein the processor, in determining the score for said seed, evaluates least one of the following: at least two characteristics of media items on an album when said seed is said album, and at least two characteristics of media items performed by the artist when said seed is said artist, wherein the processor evaluates at least two characteristics of media items on the album when said seed is said album by averaging the scores of each media item on the album in candidate list of media items to create said seed score, and wherein the processor evaluates at least two characteristics of media items performed by the artist when said seed is said artist by averaging the scores of each media item performed by said artist in said candidate list of media items to create said seed score; and wherein the user interface of a computer presents to the user the suggested list of media items and presents to the user the score for said seed and the scores of said each media item in said candidate list of media items.

11. The system of claim 10 wherein said user interface is further for providing a selection element for user selection of one or more media items from the suggested list, each of said presented media items remaining unselected by the system until selected by the user.

12. A computer storage medium having computer-executable instructions for suggesting a list of one or more media items to a user, said computer-executable instructions for performing steps comprising:

presenting instructions for presenting a user with a selection element for gathering a seed for generating a list of media items related to the seed, said selection element including a plurality of media items, each of presented media items in the selection element remaining unselected and un-played by a media player system upon being selected;

receiving instructions for receiving a seed selection from the user, said seed being a starting point for determining what media items to suggest to the user, said received seed selection remaining un-played by the media player system, said seed selection including at least one of a media item, an artist, an album name, and another media identifier, said selection being displayed as highlighted and distinguished over other media items in at least one of a playlist, a pull-down menu, a dialog box, and a search result on the selection element;

in response to the received seed selection, identifying instructions for identifying one or more characteristics of said seed; and in response to the identified characteristics of the seed, generating instructions for generating a suggested list of media items with characteristics corresponding to the one or more characteristics of said seed selection without playing the seed selection, wherein said generating instructions comprise determining instructions for determining a score for said seed, determining instructions for determining score for each media item in a candidate list of media items, and selecting instructions for selecting at least one media item from said candidate list based upon the relationship between the score of the seed and the score of the at least one media item, wherein each of the media items in the generated suggested list remains separate from any user playlist or group of selected media items until deliberate selection of one of the media items in the suggested list, wherein said determining the score for said seed comprises at least one of the following: evaluating at least two characteristics of media items on an album when said seed is said album: and evaluating at least two characteristics of media items performed by the artist when said seed is said artist, wherein said evaluating at least two characteristics of media items on the album when said seed is said album comprises averaging the scores of each media item on the album in candidate list of media items to create said seed score, and wherein said evaluating at least two characteristics of media items performed by the artist when said seed is said artist comprises averaging the scores of each media item performed by said artist in said candidate list of media items to create said seed score; and presenting the user with the suggested list of media items and presenting the user with the score for said seed and the scores for each media item in said candidate list of media items.

13. The computer storage medium of claim 12 wherein said computer-executable instructions further comprise:

presenting instructions for presenting the user with the suggested list of media items and a choice of selecting media items or groups of media items in the suggested list, each of said presented media items remaining neither unselected by the system until selected by the user;

receiving instructions for receiving a user selection of at least one media item from the suggested list; and presenting instructions for presenting the user with a playlist comprising said at least one media item selected from the suggested list.

14. The computer storage medium of claim 12 wherein said generating instructions of said computer-executable instructions further comprise:

determining instructions for determining a score for said seed, determining instructions for determining a score for each media item in a candidate list of media items, and selecting instructions for selecting at least one media item from said candidate list based upon the relationship between the score of the seed and the score of the at least one media item.

15. The computer storage medium of claim 14 wherein said determining instructions for determining a score for said seed comprises evaluating instructions for evaluating at least two characteristics of a media item when said seed is said media item; and wherein said determining instructions for determining a score for said seed further comprises calculating instructions for calculating said seed score based upon the evaluation of said characteristics; and wherein said determining instructions for determining a score for each media item in the candidate list comprise evaluating instructions for evaluating at least two characteristics of each media item in the candidate list and calculating instructions for calculating said score for each media item based upon the evaluation of said characteristics.

* * * * *